(12) United States Patent
Cahen et al.

(10) Patent No.: US 8,839,832 B2
(45) Date of Patent: Sep. 23, 2014

(54) ERGONOMIC SERVICE ARRANGEMENT FOR BEVERAGE MACHINE

(75) Inventors: Antoine Cahen, Lausanne (CH); Eric Granger, Lausanne (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/702,651

(22) PCT Filed: Jun. 9, 2011

(86) PCT No.: PCT/EP2011/059580
§ 371 (c)(1),
(2), (4) Date: Dec. 7, 2012

(87) PCT Pub. No.: WO2011/154492
PCT Pub. Date: Dec. 15, 2011

(65) Prior Publication Data
US 2013/0081739 A1  Apr. 4, 2013

(30) Foreign Application Priority Data
Jun. 9, 2010 (EP) .................................... 10165365

(51) Int. Cl.
*B65B 1/04* (2006.01)
*A47B 81/00* (2006.01)
*A47J 31/44* (2006.01)

(52) U.S. Cl.
CPC ............. *A47J 31/4482* (2013.01); *A47B 81/00* (2013.01)
USPC .......................................... 141/378; 141/346

(58) Field of Classification Search
USPC ......................................... 141/346, 369, 378
See application file for complete search history.

(56) References Cited

U.S. PATENT DOCUMENTS

2010/0251900 A1* 10/2010 Cahen et al. .................... 99/295

FOREIGN PATENT DOCUMENTS

| DE | 102008042177 A1 | 3/2010 |
|---|---|---|
| EP | 1867260 A1 | 12/2007 |
| GB | 2449307 A | 11/2008 |
| WO | WO 2009074559 A1 | 6/2009 |

* cited by examiner

*Primary Examiner* — Jason K Niesz
(74) *Attorney, Agent, or Firm* — K&L Gates LLP

(57) ABSTRACT

A machine (1) for dispensing a beverage (50) has: a service arrangement (6, 60); and a movable support (5) for supporting a user-recipient (51) in a position for collecting the beverage. The support has: an unlocking position for giving user-access to the service arrangement for servicing; and a locking position for preventing user-access to the service arrangement for servicing.

15 Claims, 1 Drawing Sheet

ERGONOMIC SERVICE ARRANGEMENT FOR BEVERAGE MACHINE

CROSS REFERENCE TO RELATED APPLICATIONS

The present application is a National Stage of International Application No. PCT/EP2011/059580, filed on Jun. 9, 2011, which claims priority to European Patent Application No. 10165365.7, filed on Jun. 9, 2010, the entire contents of which are being incorporated herein by reference.

FIELD OF THE INVENTION

The field of the invention pertains to beverage dispensing machines having a support arrangement for user-recipients such as cups and/or mugs and a service arrangement, e.g. for collecting waste or used substances such as waste ingredients or used cleaning agents or for supplying consumable substances such as beverage ingredients and/or cleaning agents.

For the purpose of the present description, a "beverage" is meant to include any human-consumable liquid substance, such as tea, coffee, hot or cold chocolate, milk, soup, baby food, etc. . . . . . A "capsule" is meant to include any pre-portioned beverage ingredient within an enclosing packaging of any material, in particular an airtight packaging, e.g. plastic, aluminium, recyclable and/or biodegradable packagings, and of any shape and structure, including soft pods or rigid cartridges containing the ingredient.

BACKGROUND ART

Certain beverage preparation machines use capsules containing ingredients to be extracted or to be dissolved; for other machines, the ingredients are stored and dosed automatically in the machine or else are added at the time of preparation of the drink.

Most beverage machines possess within a housing: filling means that include a pump for liquid, usually water, which pumps the liquid from a source of water that is cold or indeed heated through heating means, such as a heating resistor, a thermoblock or the like, a brewing unit in which an ingredient is brewed with water or a mixing unit in which ingredients are mixed together, and a beverage outlet for dispensing the prepared beverage. Typically, the beverage outlet is located above a grid for supporting a cup or other recipient under the outlet and for the passage of possible drips from the beverage outlet or other spills into a collector tray located under the grid.

For example, EP 1 440 639 discloses a beverage machine comprising a receptacle stand having a hollow interior forming a drip tray. An upper surface of the receptacle stand is provided with a grill on which the receptacle is positioned. The drip tray is removable from the housing to ease emptying of the collected water.

Drip tray devices with cup supports are well known in the art. There are also such devices that are further arranged for allowing the adjustment of the vertical position under the beverage outlet of cups of different sizes. For instance, EP 0 549 887 and U.S. Pat. No. 5,161,455 disclose devices with an adjustable cup support for small and large receptacles.

U.S. Pat. No. 5,353,692 discloses a beverage vending machine having a cup station with an upper beverage outlet and a bottom drain-gate on a drip collector. Above the drain gate, the cup station has a retractable support member for positioning small cups under the beverage outlet. This cup station is formed as a grid for allowing the passage of drips down to the drain-gate.

EP 1 731 065 discloses a beverage machine that has a drip tray device located under a beverage outlet. This device has a first support grid for a first beverage recipient covering a drip tray or collection tank. The first support grid is removable form the drip tray to give access to a second support thereunder for supporting a larger cup under the outlet. Moreover, the drip tray supports a receptacle for used capsules and can be removed en bloc with the cup support arrangement from the machine for emptying the capsule receptacle and the drip tray.

EP 1 867 260 discloses a drip tray with a cup support that is movably mounted, generally at mid-height, onto a beverage machine. The cup support has an operative horizontally extending position for positioning a small cup under the machine's beverage outlet and can be pivoted upwards against the machine's main body or otherwise moved so as to give sufficient space for positioning a large cup under the beverage outlet on a support surface located below this above movable cup support.

Likewise, WO 2009/074557 discloses a beverage preparation machine with a cup support and drip tray device located under a machine's beverage outlet. The device has a drip tray arrangement for evacuating liquid and for supporting a cup below the outlet and has an extension for hygienically supporting cups upon use.

In WO 2009/074559, a similar beverage machine is disclosed in which the cup support and drip tray device has a reservoir for collecting ingredient capsules upon use. The device includes an arrangement for unjamming the system when the reservoir is so over-filled with used capsules as to interfere with the structure of the machine and to prevent removal of the device with the over-filled receptacle.

In one particular embodiment (FIGS. 7a and 7b of WO 2009/074559), the volume of the capsule reservoir can be increased in size upon over-filling by moving one of the reservoir's sidewalls apart outwards from the machine's housing. The reservoir sidewall is displaced over the cup support that is be pivoted down (e.g. under the effect of gravity) out of the way of the movable sidewall to allow its passage. In other words, in this machine, the cup support and drip tray device with the collection reservoir can be freely moved into and out of the machine even when the collection receptacle is over-filled with used capsules. In this latter configuration, the device can be removed from the machine by increasing the collection volume of the receptacle. This is achieved by displacing a sidewall thereof over the cup support that is freely movable into the a position allowing such displacement. In summary, in this configuration, neither the capsules in the receptacle nor the cup support that may freely fall into a position for allowing the displacement of the sidewall under the effect of gravity and increase the storage volume of the receptacle nor any other means, may jam the cup support and drip tray device in the machine or otherwise prevent removal of the device from the machine.

SUMMARY OF THE INVENTION

The invention relates to a machine for dispensing a beverage. For instance, the machine is a coffee, tea, chocolate, cacao, milk or soup preparation machine. In particular, the machine is arranged for preparing within a beverage preparation module a beverage by passing hot or cold water or another liquid through a capsule containing an ingredient, such as a flavouring and/or nutritional ingredient, of the beverage to be prepared, such as ground coffee or tea or chocolate or cacao or milk powder.

The machine includes: a service arrangement; and a movable support for supporting a user-recipient, e.g. a cup and/or mug support, in a position for collecting the beverage.

Typically, the service arrangement is configured for collecting at least one of: one or more waste beverage ingredients, such as a used flavouring ingredient and/or waste water; one or more used capsules for supplying a beverage ingredient into said machine; and a cleaning agent, such as a cleaning, rinsing or descaling liquid. A suitable service arrangement may be configured for storing a supply of the abovementioned beverage ingredients and/or capsules before use or a supply of the abovementioned cleaning agent before use.

In accordance with the invention, in this machine the support has: an unlocking position for giving user-access to the service arrangement for servicing; and a locking position for preventing user-access to the service arrangement for servicing.

Hence, as opposed to prior art machines, in particular to the above discussed particular embodiment of WO 2009/074559, a beverage machine is provided in which a support for a user-recipient may actually lock and unlock user-access to the mnachine's service arrangement for servicing. A simple system is thus provided to prevent or limit the risk of accidental exposure to the service arrangement, in particular undesired exposure to waste or used materials contained therein, and/or the risk of wrong handling of the machine during normal operation of dispensing a beverage by interfering with the proper functioning of the service arrangement.

The user-recipient support can be movable in the machine between the locking and unlocking positions, in particular movable in the machine from the locking position to the unlocking position. In other words, for convenience, the service arrangement may be accessed by a user for servicing after it has been unlocked by the support, the unlocking of the service arrangement requiring no removal of the support from the machine.

The machine may have a body, e.g. a beverage preparation module with a holding frame and/or housing, in which and/or to which the service arrangement is locked when the support is in the locking position. Optionally, the service arrangement forms a cavity in the body and user-access to the cavity can be prevented by the support in the locking position.

The service arrangement may comprise a removable service unit, the service unit being locked in the body by the support in the locking position. The support may be connected to: the service unit, the service unit being removable en bloc with the support once the support is in the unlocking position; or the machine body, the service unit being removable from the body and the support when the support is in the unlocking position.

The user-recipient support may be rotatable relative to the service arrangement between the locking and unlocking positions, in particular from the locking position to the unlocking position and/or vice versa. The support can be rotatable about a generally vertical and/or horizontal axis.

The support may be movable in translation between the locking and the unlocking positions, in particular from the locking position to the unlocking position.

Typically, the machine has a beverage outlet. In this case, the support may have: a position for supporting a smaller user-recipient under the outlet for collecting beverage dispensed therefrom; and a position for allowing a larger user-recipient to be placed under the outlet for collecting beverage dispensed therefrom.

The support, in the position for larger user-recipients, may uncover a placement surface for larger user-recipients under the outlet, optionally the placement surface being a virtual surface or being formed by the support at a lower position than the position for supporting a smaller user-recipient. For example, the machine comprises a further user-recipient support, e.g. a lower support, forming the placement surface.

The principle of using a movable support for handling user-recipients of different sizes in the same machine is known, for example from EP 1 731 065, EP 1 867 260, EP 1 811 881 and WO 2009/074557, the teachings of which are hereby incorporated by way of reference.

In particular, the position of the support for supporting a smaller user-recipient and the position of the support for allowing placement of a larger user-recipient are equal to the support's locking and unlocking positions, respectively, or vice versa.

In one embodiment, the machine has a front face bearing a beverage outlet, the support being movable away from the front face for giving user-access to the service arrangement through the front face for servicing the service arrangement and movable towards the front face for preventing user-access to the service arrangement for servicing.

The invention also relates to a machine for dispensing a beverage, in particular a machine comprising any feature or combination of features mentioned above. The machine has a generally upright front face bearing an outlet and a movable support for supporting a user-recipient in a position for collecting beverage from the outlet. The support is rotatable around an axis generally perpendicular to the front face, in particular a generally horizontal axis.

The support may be movable so that the machine can accept different user-recipients of different sizes and/or for locking and/or unlocking a service arrangement, in particular as discussed above.

The support may have a pivoting end at or adjacent to the axis around which the support rotates. The machine may have a stopper, the support having an intercepting end which intercepts the stopper for limiting the movement of support, in particular in a horizontal position. For example, the support has an edge movable generally parallel to the front face, e.g. along an arc of rotation, the intercepting end being located opposite the pivoting end on or adjacent to the edge.

In the context of the present disclosure, the relative orientation of the machine, e.g. references to the machine's top, front, bottom, side, rear, etc., unless specified otherwise, typically relate to the orientation of operation of the machine, e.g. on top of a table, with the machine in front of a user for naturally operating the machine to dispense a beverage.

BRIEF DESCRIPTION OF THE DRAWINGS

The invention will now be described with reference to the schematic drawings, wherein.

DETAILED DESCRIPTION

Figure 1:
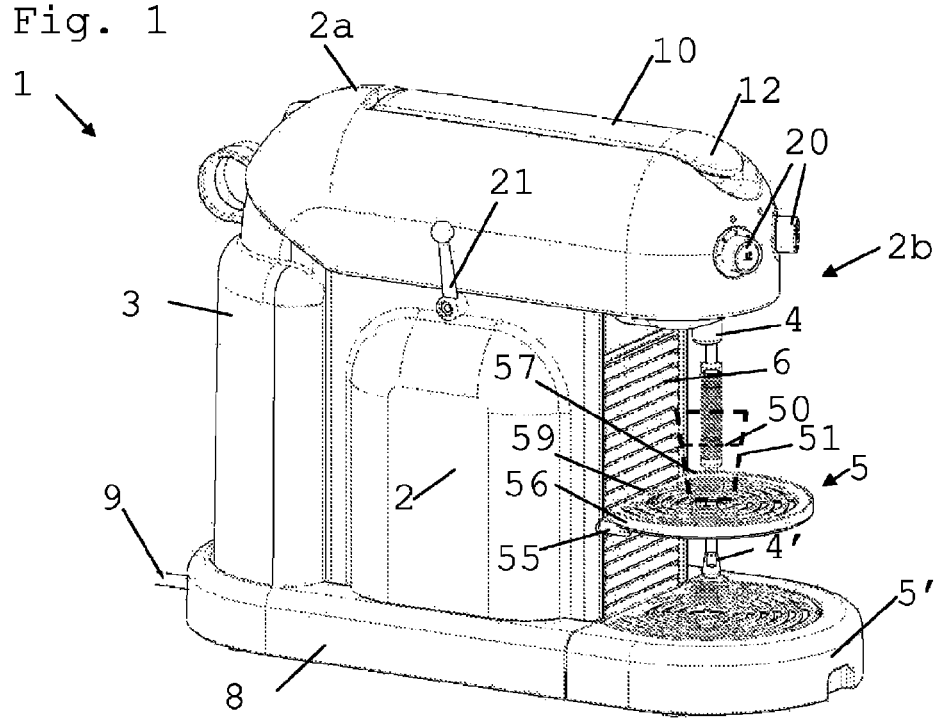
FIGS. 1 and 2 are two perspective views of an embodiment of a beverage dispensing machine according to the invention.
Figure 2:
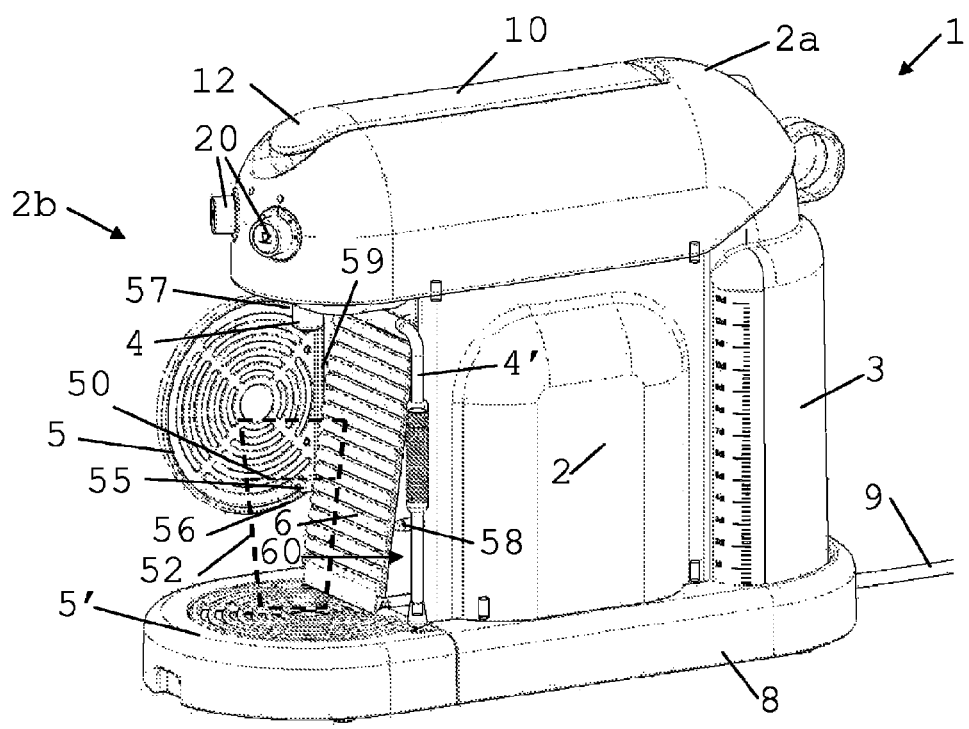

FIGS. 1 and 2 illustrates an embodiment of a beverage machine 1 according to the present invention. For instance, the machine is a machine for preparing and dispensing tea and/or coffee.

Machine 1 can be electrically powered, typically by the mains, via an electric cord 9.

Machine 1 has a beverage preparation module with an internal circuit for circulating liquid from reservoir 3. The module is covered by a housing 2a and has a foot 8 to form a body 2. The beverage preparation module in the housing is arranged for holding a flavouring ingredient, in particular a pre-portioned ingredient such as an ingredient supplied to such module within a capsule, and circulating a liquid therethrough to form a beverage 50. Examples of such modules are disclosed in WO 2009/074550 and in WO 2009/130099, the teachings of which are hereby incorporated by way of reference.

Hence, the liquid, e.g. water, may be stored in tank 3 and supplied to the beverage preparation module from tank 3. Further details on tank or reservoir 3 are for example disclosed in EP 10163637.1.

Beverage 50, upon formation, can be dispensed via an outlet 4 to a dispensing area 5,5', e.g. a support for holding a user cup or mug. The dispensing area may include a first support 5 for smaller cups 51, as illustrated in FIG. 1, that is movable away from under outlet 4 so as to give access to a lower second support 5' for larger cups or mugs 52, e.g. for dispensing lungos or extra-large beverages, as illustrated in FIG. 2. The lower cup support 5' may be connected to base 8 of machine 1.

Machine 1 has a service unit 6 for collecting used ingredients, such as tea leaves or ground coffee, e.g. within used capsules, and waste liquid. Service unit 6 may be a collector include an upper compartment for solids and a lower compartment for liquids. Service unit 6 is insertable, e.g. slidable, into a seat or cavity 60 formed in body 2 and removable therefrom for servicing, e.g. emptying the solids and/or liquids contained therein. For example, the storage capacity of collector 6 for a used ingredient may be aligned to the storage capacity of reservoir 3 for the supply of liquid such as water, e.g. as taught in PCT/EP10/056194.

Collector 6 may be positioned underneath the beverage preparation module to collect upon beverage preparation the used flavouring ingredient evacuated to collector 6, e.g. by gravity. Collector 6 typically has an anti-clogging arrangement, as for example taught in WO 2009/074559 and in WO 2009/135869, which are hereby incorporated by way of reference.

Machine 1 also includes a steam and/or hot water generator connected to an outlet 4', e.g. for the preparation of frothed milk and/or tea, e.g. as taught in EP 10163638.9, the content of which is hereby incorporated by way of reference.

Machine 1 has a handle 10 movable between: a transfer position (not shown) for loading the ingredient, e.g. within a capsule, into the module and/or evacuating such ingredient from the module; and a circulation position (shown in FIGS. 1 and 2) for circulating the liquid through the ingredient.

Typically, handle 10 actuates an ingredient holder with an ingredient chamber, such as a brewing unit, of the beverage preparation module from: a transfer position for insertion of the flavouring ingredient into the holder and/or evacuation of this ingredient therefrom; and a circulation position for circulating the liquid through this ingredient in the ingredient holder to form beverage 50. The ingredient holder, e.g. a brewing unit, may have two relatively movable parts that are moved apart for opening the ingredient holder into the transfer position and moved together for closing the ingredient holder into the circulation position. In the circulation position, the ingredient holder may tightly enclose the flavouring ingredient to ensure proper guidance of the liquid through the ingredient. Examples of suitable brewing unit configurations are for example disclosed in EP 1 646 305, EP 1 859 713, EP 1 859 714 and WO 2009/043630.

In the circulation position (FIGS. 1 and 2), handle 10 is resting on or in a top face of housing 2a. In particular handle 10 with its extremity 12 can be flush with housing 2a that has a corresponding shape, e.g. to facilitate cleaning of the surface of body 2.

Handle 10 is a single-arm lever generally shaped as a straight bar that is slightly curved or bent at its extremity 12 for ergonomic reasons, namely for facilitating the manual application of force onto handle 10 by a convenient orientation of contact surface for a user's hand when handle 10 is moved from the transfer position (not shown) to the circulation position.

In the transfer position, handle 10 entirely uncovers a passage for allowing the insertion of the flavouring ingredient, e.g. within a capsule, into the beverage preparation module. This ingredient insertion passage can be arranged for introduction by gravity of the flavouring ingredient into the beverage preparation module, drive portion 12 being located generally above and/or adjacent the passage when handle 10 is in the transfer position to facilitate the coordination between manual introduction of a flavouring ingredient, e.g. within a capsule, into the passage and manually actuating handle 10, in particular using the same hand.

Further details regarding handle 10 and the handling of ingredient are for example disclosed in EP 10163649.6.

Furthermore, machine 1 includes a user-interface 20 for initiating circulation of the liquid through the flavouring ingredient in the beverage preparation module. User-interface 20 may include a plurality of user selectors for initiating preparation of beverages of different flavours and/or of different sizes and/or different types. For instance, user-interface 20 includes a first user-selector and a second user-selector, e.g. in the form of push-and-turn buttons, for selecting the dispensing of espresso coffee and of lungo coffee. Machine 1 may also include a master switch or a steam 21.

Further details regarding such user-selectors can be found in EP 10163635.5 and in EP 10163649.6.

The beverage preparation module typically includes one or more of the following components:

a) the ingredient holder, such as a brewing unit, for receiving the flavouring ingredient of this beverage, in particular a pre-portioned ingredient supplied within a capsule, and for guiding an incoming flow of liquid, such as water, through this ingredient to beverage outlet 4;

b) an in-line heater, such as a thermoblock, for heating this flow of liquid to be supplied to the ingredient holder;

c) a pump for pumping liquid through the in-line heater;

d) one or more fluid connecting members for guiding liquid from a source of liquid, such as tank 3 of liquid, to beverage outlet 4;

e) an electric control unit, in particular comprising a printed circuit board (PCB), for receiving instructions from a user via an interface and for controlling the in-line heater and the pump; and f) one or more electric sensors for sensing at least one operational characteristic selected from characteristics of the ingredient holder, the in-line heater, the pump, liquid reservoir 3, ingredient collector 6, a flow of liquid, a pressure of liquid and a temperature of liquid, and for communicating such characteristic(s) to the control unit.

The heater may be a thermoblock or an on demand heater (ODH), for instance an ODH type disclosed in EP 1 253 844, EP 1 380 243 and EP 1 809 151. Examples of suitable brewing units and capsule management are for example disclosed in WO 2005/004683, WO2007/135136 and WO 2009/043630, which are hereby incorporated by way of reference. Suitable beverage preparation modules are for instance disclosed in WO 2009/074550 and WO 2009/130099, which are hereby incorporated by way of reference.

Handle 10 and user-interface 20 can be arranged so that user-interface 20 is operable by a human hand while it is still in contact with extremity 12 of handle 10 upon driving handle 10 into the circulation position.

The embodiments shown in FIGS. 1 and 2 will now be discussed in greater details in relation with user-recipient support 5 and service arrangement 6, 60. In particular, support 5 has: an unlocking position for giving user-access to service arrangement 6, 60 for servicing (FIG. 2); and a locking position for preventing user-access to service arrangement 6, 60 for servicing (FIG. 1).

Service arrangement 6, 60 includes: cavity 60 delimited by body 2; and service unit 6 that is movable in and out from cavity 60. FIG. 2, illustrates service unit 6, e.g. a collector, slightly tilted and sticking out of cavity 60 in body 2. Collector 6 may be allowed to tilt for example to avoid clogging as generally explained in WO 2009/135869, the teachings of which are hereby incorporated by way of reference.

As illustrated in FIG. 1, support 5 has a position in which is locks service unit 6 in cavity 60, e.g. by extending generally across, such as generally horizontally across, the front opening of cavity 60 containing service unit 6. In this position of support 5, a user is prevented from removing service unit 6 from cavity 60 or from accessing cavity 60 via its front opening.

In FIG. 2, support 5 has a position in which it unlocks service unit 6, i.e. service unit 6 may be drawn out of cavity 60 and slid back into it without interference with support 5. In particular, in FIG. 2, support 5 is in a generally vertical position moved away from this front opening of cavity 6, e.g. adjacent a side of this front opening.

As shown in FIGS. 1 and 2, support 5 in the locked and unlocked positions is connected to body 2, service unit 6 being removable and separable from body 2 and support 5 when support 5 is in the unlocked position.

Alternatively, it is possible to connect the user-recipient support to the service unit so that in the unlocked position, the support is removable with the service unit. For instance, the support is pivotally connected to the service unit and has one or more hooks that cooperate/s in the locking position with one or more hook-retainers in the machine's body and that is/are released from the hook-retainer/s when the support is pivoted into the un-locking position.

As illustrated in FIGS. 1 and 2, support 5 is rotatable relative to service arrangement 6, 60 between the locking and unlocking positions, in particular from the locking position to the unlocking position and/or vice versa. In particular, support 5 is rotatable about a generally horizontal axis 55, e.g. protruding from body 2 adjacent a side of the front opening of cavity 60.

As mentioned above, support 5 can have: a position for supporting a smaller user-recipient 51, e.g. a cup such as an espresso cup, under outlet 4 for collecting beverage 50 dispensed therefrom, typically for collecting a smaller volume of beverage (FIG. 1); and a position for allowing a larger user-recipient 52, e.g. a mug or larger cup, to be placed under the outlet 4 for collecting beverage 50 dispensed therefrom, typically for collecting a larger volume of beverage 50 (FIG. 2).

When support 5 is in the position for larger user-recipients 52, it may uncover a placement surface for larger user-recipients 52 under the outlet 4. In particular, this placement surface may be formed by further support 5', e.g. connected to body 2, in particular to base 8 of body 2.

In a variation, the placement surface can be a virtual surface, .e.g. the surface of a table on which the beverage dispensing machine is placed, or can be formed by the same support at a lower position than the position for supporting a smaller user-recipient. In the latter case, the support may be vertically slidable, e.g. along the sides of the front opening of the cavity, the vertical sliding movement being for example associated with the locking and/or unlocking function of the support.

As illustrated in FIGS. 1 and 2, the position of support 5 for supporting a smaller user-recipient 51 and the position of support 5 for allowing placement of a larger user-recipient 52 are equal to the support's locking and unlocking positions, respectively.

Typically, machine 1 has a front face 2b bearing beverage outlet 4. Support 5 can be movable about and/or away from front face 2b for giving user-access to service arrangement 6, 60 through front face 2b for servicing the service arrangement 6, 60 and movable in the opposite direction for preventing user-access to service arrangement 6, 60 for servicing.

In a particular embodiment, machine 1 may have a generally upright front face 2b bearing outlet 4 and movable support 5 for supporting a user-recipient 51 in a position for collecting beverage 50 from outlet 4. Support 4 is rotatable around an axis 55 generally perpendicular to front face 2b, e.g. a generally horizontal axis. Support 5 has a pivoting end 56 at or adjacent to axis 55 around which support 5 rotates. Moreover, machine 1 has a stopper 58, e.g. an element protruding from body 2, and support 5 has an intercepting end 57 which intercepts stopper 58 for stopping the movement of support 5 when reaching stopper 58, in particular in a horizontal position of support 5 for supporting small cup 51 under outlet 4. In this configuration, support 5 is safely held by stopper 58 and stabilised under by gravity. In particular, support 5 has an edge 59 movable generally parallel to front face 2b and intercepting end 57 is located opposite pivoting end 56 on or adjacent to edge 59.

The invention claimed is:

1. A machine for dispensing a beverage, the machine comprising:
   a body;
   a service arrangement comprising a removable service unit; and
   a movable support for supporting a user-recipient in a position for collecting the beverage, the movable support having an unlocking position for providing user-access to the service arrangement for servicing, and a locking position for preventing user-access to the service arrangement for servicing, the service unit being locked in the body when the movable support is in the locking position, and the movable support being connected to the body so as to be removable from the body when the movable support is in the unlocking position.

2. The machine of claim 1, wherein the support is rotatable relative to the service arrangement between the locking and unlocking positions.

3. The machine of claim 2, wherein the support is rotatable about a generally vertical and/or horizontal axis.

4. The machine of claim 1, which has a beverage outlet and the support has:
   a position for supporting a smaller user-recipient under the outlet for collecting beverage dispensed therefrom; and
   a position for allowing a larger user-recipient to be placed under the outlet for collecting beverage dispensed therefrom.

5. The machine of claim 4, wherein the support in the position for larger user-recipients uncovers a placement surface for larger user-recipients under the outlet.

6. The machine of claim 5, comprising a further support forming the placement surface.

7. The machine of claim 4, wherein the position of the support for supporting a smaller user-recipient and the position of the support for allowing placement of a larger user-recipient are equal to the support's locking and unlocking positions, respectively, or vice versa.

8. The machine of claim 1, comprising a front face having a beverage outlet, the support being movable about and/or away from the front face for providing user-access to the service arrangement through the front face for servicing the service arrangement and movable in an opposite direction for preventing user-access to the service arrangement for servicing.

9. The machine of claim 1 comprising a generally upright front face bearing an outlet, wherein the movable support
   is rotatable around an axis generally perpendicular to the front face.

10. The machine of claim 9, wherein the support has a pivoting end at or adjacent to the axis around which the support rotates.

11. The machine of claim 9, comprising a stopper and the support has an intercepting end which intercepts the stopper for stopping a movement of support.

12. A machine for dispensing a beverage, the machine comprising:
    a generally upright front face bearing an outlet;
    a stopper; and
    a movable support for supporting a user recipient in a position for collecting beverage from the outlet, the movable support being rotatable around an axis generally perpendicular to the front face, the movable support comprising an edge movable generally parallel to the front face and an intercepting end that intercepts the stopper for stopping a movement of the movable support, the intercepting end being located opposite a pivoting end on or adjacent to the edge.

13. The machine of claim 4, wherein the support in the position for larger user-recipients uncovers a placement surface for larger user-recipients under the outlet, the placement surface being a virtual surface or being formed by the support at a lower position than the position for supporting a smaller user-recipient.

14. A machine for dispensing a beverage, the machine comprising:
    a service arrangement;
    a movable support for supporting a user-recipient in a position for a collecting the beverage, the movable support having an unlocking position for providing user-access to the service arrangement for servicing, and a locking position for preventing user-access to the service arrangement for servicing; and
    a generally upright front face bearing an outlet, the movable support being rotatable around a generally horizontal axis that is generally perpendicular to the front face.

15. The machine of claim 1, wherein the service arrangement forms a cavity in the body, and user-access to the cavity is prevented by the movable support in the locking position.

* * * * *